W. S. SEARLES.
TEMPLE FOR EYEGLASSES AND SPECTACLES.
APPLICATION FILED DEC. 28, 1915.
1,293,215.
Patented Feb. 4, 1919.
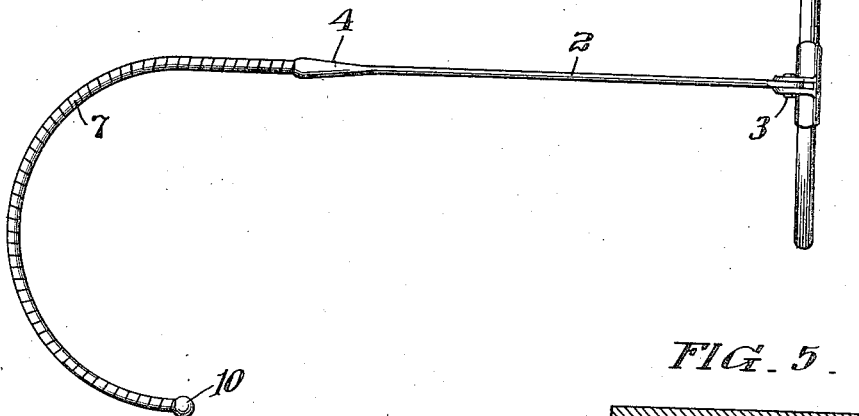
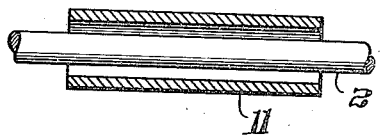
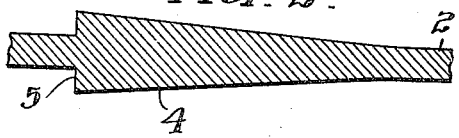
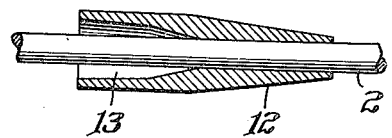
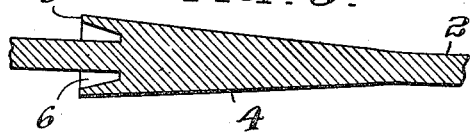
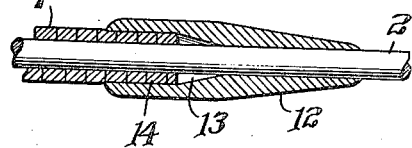
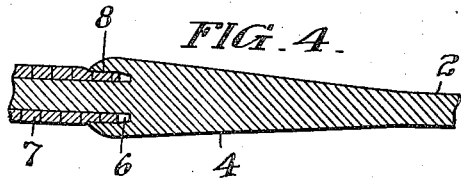
Witness
Daniel Webster Jr.
Inventor
Wayne S. Searles
By
Cyrus N. Anderson
Attorney

UNITED STATES PATENT OFFICE.

WAYNE S. SEARLES, OF NEWARK, NEW JERSEY, ASSIGNOR TO NEW JERSEY OPTICAL CO., OF NEWARK, NEW JERSEY, A CORPORATION OF NEW JERSEY.

TEMPLE FOR EYEGLASSES AND SPECTACLES.

1,293,215.          Specification of Letters Patent.          Patented Feb. 4, 1919.

Application filed December 28, 1915. Serial No. 68,978.

*To all whom it may concern:*

Be it known that I, WAYNE S. SEARLES, a citizen of the United States, and a resident of Newark, county of Essex, State of New Jersey, have invented certain new and useful Improvements in Temples for Eyeglasses and Spectacles, of which the following is a specification.

My invention relates to temple wires for eyeglasses and spectacles in which means is provided for preventing the portion thereof which extends around the top and rear sides of the ears from hurting the same either by cutting or abrasion.

Efforts have been made heretofore to provide temples for spectacles with such means but one difficulty has been to secure the said means to the temple wire in a satisfactory manner.

It is one of the objects of my invention to provide an improved construction of means for securing a covering upon a metallic temple wire, such covering being preferably of non-metallic material.

Other objects and advantages of my invention will be referred to in the detailed description thereof which follows or will be apparent from such description.

In order that my invention may be more readily understood and its advantages more fully appreciated reference should be had to the accompanying drawing in which I have illustrated convenient forms of embodiment thereof. It will be understood, however, that changes in the details of construction may be made within the scope of the claims without departing from my invention.

In the drawings:—

Figure 1 is a side elevation of a pair of spectacles or eyeglasses comprising a temple wire provided with my invention;

Fig. 2 is a longitudinal section of a portion of the temple wire illustrating one step in the construction of the same;

Fig. 3 is a similar view showing the condition of the wire after the performance of a succeeding step in the manufacture of the said wire;

Fig. 4 is a longitudinal central sectional view of a portion of the temple wire showing the manner in which the non-metallic covering for the rear portion of the temple wire is secured in position;

Fig. 5 is a view showing a portion of a temple wire with a section of tube surrounding the same, said tube being shown in longitudinal section;

Fig. 6 is a longitudinal sectional view of the temple wire and of the tube shown in Fig. 5, said tube having been compressed and clamped tightly against the said temple wire; and Fig. 7 is a longitudinal sectional view of a portion of the completed temple wire showing a portion of the non-metallic covering for the rear end portion of the temple wire clamped between the rear end portion of the said tubular member and the temple wire.

Referring to the drawings, 1 designates the lens or the frame of a pair of eyeglasses and 2 a temple wire having hinged connection with the said lens or frame at 3.

In the construction of the temple wire shown in Figs. 1 to 4 it is provided with an enlarged integral portion 4 situated, generally speaking, at a point midway between its front and rear ends. At one stage of the manufacture of the said temple wire a shoulder 5 is formed which shoulder is notched as indicated at 6 to form an annular groove or chamber surrounding the main or body portion of the temple wire for the reception of the inner front end of the spirally coiled non-metallic covering 7 with which the outer rear end portion of the temple wire is provided. The inner end portion of said spirally coiled non-metallic covering having been inserted in the annular groove or chamber 6 the edge portions of the metal wall surrounding said chamber are compressed and swaged down upon the end portion of the said non-metallic covering within said chamber as indicated at 8 in Fig. 4.

It will be seen, therefore, that I have provided in the construction shown in these Figs. 1, 2, 3 and 4, means integral with the temple wire for firmly attaching and securing the front end of the spirally coiled non-metallic covering 7 to the said temple wire. The outer rear end of said temple is provided with a ball or knob 10 of usual construction.

In Figs. 5, 6 and 7 I have shown a modification of the structure in which the inner end of the covering 7 for the temple wire 2 is attached and secured to the said wire by means not integral with the latter. In this form of construction I take a section of tube 11, as shown in Fig. 5, and by a suitable tool compress a considerable portion of the said tube so as to clamp it with sufficient force against the temple wire 2 to fix and secure the same permanently in position. The compressed end is tapered toward the front as indicated at 12. As a result of such compression an annular chamber 13 is provided (corresponding to the annular chamber or groove 6 in the construction first described) into which the inner or forward end of the spirally coiled non-metallic covering 7 may be extended. The rear end portion of said tube is then compressed and swaged against the intermediate portion 14 of the said covering whereby the latter is firmly held in position upon the said wire.

I claim:—

1. A temple wire for eyeglasses or spectacles consisting of a metallic wire having intermediate its ends a member rigidly or fixedly secured to the wire, said member being provided with an open annular chamber surrounding said wire, the opening of said chamber facing toward the rear end of said wire, and a covering for the portion of said wire in rear of said chamber, the front end of said covering extending into said chamber and being held therein by the clamping action thereon of the walls of said chamber, said walls being compressed against the inclosed portion of said covering.

2. A temple for eyeglasses or spectacles consisting of a metallic wire having intermediate its ends (at a point a substantial distance from either end) a wall connected with said wire and spaced therefrom to form an annular chamber said chamber opening toward the rear end of said wire, a covering of non-metallic material for the portion of said wire in rear of said wall the forward end of said covering extending into said chamber and being clamped against the said wire and held in position by compressing the said wall firmly against the inclosed portion of said covering.

3. A temple for eyeglasses or spectacles consisting of a metallic wire having a surrounding wall secured thereto intermediate its ends (at a point a substantial distance from either end) said wall being spaced from said wire and forming an annular chamber around the said wire said chamber opening toward the rear end of said wire, a spiral non-metallic covering for the portion of said wire in rear of said wall the forward end of said covering extending in the said annular chamber and being clamped between the said wire and the said wall by compressing and swaging the latter down upon the inclosed portion of said covering.

4. A temple wire for eyeglasses or spectacles having an enlarged integral portion intermediate its ends the rear end portion of the enlargement being provided with an annular groove surrounding the main or body portion of the said wire, a covering for the portion of said wire in rear of said enlargement, the inner end of said covering extending into said annular groove and the portion of said enlargement forming said groove being compressed and swaged against the portion of said covering inserted into said groove to permanently connect the same in position upon said wire.

5. A temple wire for eyeglasses or spectacles having an enlarged integral portion about midway of its length the rear end of said enlarged portion being provided with an annular groove surrounding the main or body portion of said wire said groove constituting an annular chamber, a spiral covering of non-metallic material upon the portion of said wire in rear of said enlargement the forward end of said covering being situated within the said annular chamber, the portion of said enlargement surrounding the inner end portion of said covering being compressed and swaged against the latter to clamp and hold the same permanently in position.

In testimony that I claim the foregoing as my invention I have hereunto signed my name this 24 day of December, A. D. 1915.

WAYNE S. SEARLES.